United States Patent [19]

Fukada

[11] Patent Number: 5,086,384
[45] Date of Patent: Feb. 4, 1992

[54] MASTER-SLAVE-TYPE CONTROL SYSTEM WITH STAND-BY SUSPENDING CONTROL STATION

[75] Inventor: Akio Fukada, Hachiouji, Japan
[73] Assignee: Kabushiki Kaisha Toshiba, Kawasaki, Japan
[21] Appl. No.: 403,286
[22] Filed: Sep. 7, 1989
[30] Foreign Application Priority Data
  Sep. 7, 1988 [JP] Japan .................. 63-222487
[51] Int. Cl.$^5$ ............................ G06F 11/20
[52] U.S. Cl. .................. 364/187; 364/132; 371/9.1
[58] Field of Search .......... 371/9.1; 364/133, 132, 364/131, 187

[56] References Cited

U.S. PATENT DOCUMENTS

| | | | |
|---|---|---|---|
| 3,636,331 | 1/1972 | Amrehn | 364/133 |
| 4,198,678 | 4/1980 | Maatje et al. | 364/187 |
| 4,351,023 | 9/1982 | Richer | 371/9.1 |
| 4,567,560 | 1/1986 | Polis et al. | 364/132 |
| 4,623,883 | 12/1986 | Konen | 371/9.1 |
| 4,672,529 | 6/1987 | Kupersmit | 364/187 |
| 4,773,072 | 9/1988 | Fennel | 364/187 |
| 4,775,976 | 10/1988 | Yokoyama | 371/9.1 |
| 4,872,106 | 10/1989 | Slater | 364/200 |
| 5,008,805 | 4/1991 | Fiebig et al. | 364/132 |

Primary Examiner—Jerry Smith
Assistant Examiner—Patrick D. Muir
Attorney, Agent, or Firm—Foley & Lardner

[57] ABSTRACT

In a master-slave-type control system, a normal supervisory control station which is a master device, control terminal devices, and a stand-by supervisory control station which is a slave device for effecting an operation of the normal supervisory control station in place thereof are connected with a common transmission passage. The normal supervisory control station receives data from each control terminal device repeatedly sent on the transmission passage to the normal supervisory control station, collects the data from each control terminal device, and sends its internal data on the transmission passage to an imaginary station at the end of each period of data collection. The stand-by supervisory station intercepts the data of each control terminal device repeatedly send on the transmission passage to the normal supervisory control station, collects the data from each control terminal device, and intercepts the data sent from the normal supervisory control station on the transmission passage to the imaginary station at the end of each period of data collection, whereby switching from control by the normal supervisory control station to control by the stand-by supervisory control station is carried out.

9 Claims, 4 Drawing Sheets

501 : PREAMBLER
502 : START FLAG
503 : SECONDARY STATION ADDRESS
504 : PRIMARY STATION ADDRESS
505 : PRIMARY STATION ABNORMAL FLAG
506 : TEXT
507 : CRC CODE
508 : END FLAG

MASTER-SLAVE-TYPE CONTROL SYSTEM WITH STAND-BY SUSPENDING CONTROL STATION

BACKGROUND OF THE INVENTION

1. Field of the Invention

The present invention relates to a master-slave-type control system having a back-up function, and particularly to a master-slave-type control system for effecting back-up switching from a normal or running supervisory control station to a stand-by supervisory control station without using exclusive signal lines.

2. Description of the Prior Art

There is known a master-slave-type control system in which there is a normal supervisory control station as a master device, one or more control terminal devices as slave devices, and a stand-by supervisory control station for effecting operation of the normal supervisory control station in place thereof are connected with a common transmission passage. In this system, back-up control for detecting an abnormality of the normal supervisory control station and switching of control by the normal supervisory control station to that by the stand-by supervisory control station is carried out in the following manner.

Namely, an exclusive information collection device for collecting tracking information provided on the transmission passage collects and stores control information always transmitted from a control terminal device to the normal supervisory control station. A watchdog timer is provided in the normal supervisory control station. The watchdog timer detects an abnormality of the normal supervisory control station, transmits its output in the form of a contact output, and transmits the output to the stand-by supervisory control station through signal lines. Then, the abnormal station is separated based on the abnormal output thereof, and at the same time, the tracking information is downloaded from the exclusive collection device to the stand-by supervisory control station so as to make the stand-by station effect the function of the normal station in place thereof.

However, in the master-slave-type control system, when the stand-by station executes as a proxy for any running station of a plurality of the normal supervisory control stations, an abnormal detection process circuit for a plurality of the supervisory control stations, that is, the watchdog timer and collection circuit, becomes complex as the number of the supervisory control stations increases. With said complexity, the exclusive signal line would require complex wiring to the abnormal detection process circuit and the respective supervisory control stations.

SUMMARY OF THE INVENTION

The present invention was invented in the light of the above problems, and an object thereof is to provide master-slave-type control system for enabling a back-up switching from a normal supervisory control station to a stand-by supervisory control station without any exclusive signal lines.

In order to achieve this object, the present invention is characterized in that in a master-slave-type control system comprising a normal supervisory control station as a master device, one or more control terminal devices as slave devices, and a stand-by supervisory control station for effecting operation of the normal supervisory control station in place thereof are connected with a common transmission passage.

The normal supervisory control station receives data from each control terminal device repeatedly sent on the transmission passage to the normal supervisory control station, collects the data from each of the control terminal devices, and sends its internal data on the transmission passage to an imaginary station at the end of each period of data collection.

The stand-by supervisory station intercepts the data of each of the control terminal devices repeatedly sent on the transmission passage to the normal supervisory control station, collects the data from each of the control terminal devices, and intercepts the data sent from the normal supervisory control station on the transmission passage to the imaginary station at the end of each period of data collection, thereby carrying out switching from control by the normal supervisory control station to control by the stand-by supervisory control station.

According to the above arrangement, since the stand-by supervisory control station intercepts the data sent on the common transmission passage, and effects data collection from each control terminal device and the condition of supervision of the normal supervisory control station, it becomes unnecessary to connect the normal station and the stand-by station with exclusive signal lines. Further, it becomes unnecessary to build the watchdog timer in the normal supervisory control station.

These and other objects, features and advantages of the present invention will be more apparent from the following description of a preferred embodiment taken in conjunction with the accompanying drawings.

DETAILED DESCRIPTION OF THE EMBODIMENT

Figure 1:
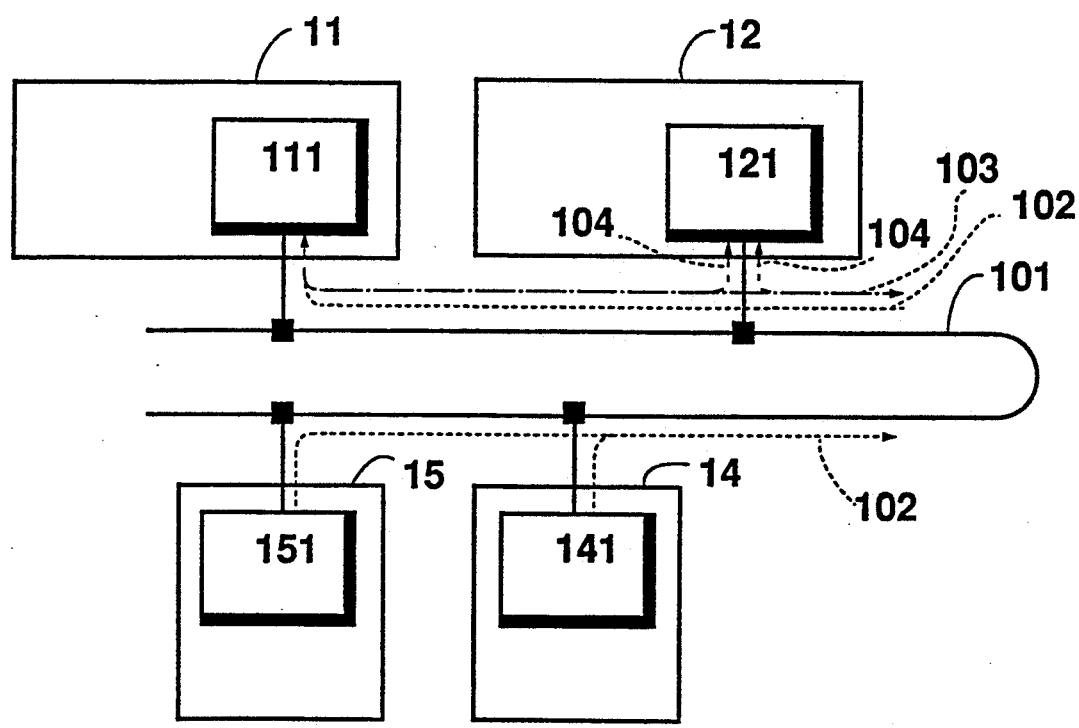
FIG. 1 is a block diagram to show the entire structure of a master-slave-type control system of an embodiment of the present invention.

In FIG. 1, there is shown a master-slave-type control system embodying the present invention in which there is provided a normal supervisory control station (operator console) 11 as a master device, two control terminal devices (process controllers) 14, 15, as plane devices, and a stand-by supervisory control station 12 for effecting operation of the normal supervisory control station 11 in place which are connected with a common transmission passage 101.

In the normal supervisory control station 11, there is provided a communication control device 111, while in the stand-by supervisory control station 12 there is provided another communication control device 121, and in the respective control terminal devices 14, 15 there are provided other communication control devices 141, 151. These communication control devices 111, 121, 141 and 151 are connected to one another through the transmission passage 101.

The specific structure of these communication control devices 111, 121, 141 and 151 will be described hereinafter.

The stand-by supervisory control station 12 is so composed as to present the function and performance of the normal supervisory control station 11 in place thereof.

While, the control terminal devices 14, 15 are able to be controlled by one or more loops, and may be a group of controllers composed by plug-in units of a card for each of the loops, also each may be a one-loop controller.

The normal and the stand-by supervisory control station 11, 12 usually have display devices such as CRT displays, input devices such as keyboards, output devices such as printers, and external memory devices such as hard disks, respectively. Further, it is possible for an operator to control and operate the entire system.

In the following description, an address on the transmission passage 101 of the normal supervisory control station 11 also is designated by reference numeral 11, another address on the transmission passage 101 of the stand-by supervisory control station 12 also is designated by reference numeral 12, and addresses on the transmission passage 101 of the respective control terminal devices 14, 15 also are designated by reference numerals 14, 15, respectively.

Incidentally, in FIG. 1, a route for collecting information from the control terminal devices 14, 15 to the running supervisory control station 11 is designated by arrow 102, and a route for releasing information from the running supervisory control station 11 is designated by arrow 103. Further another route for intercepting information in the stand-by supervisory control station 12 is designated by arrow 104.

Figure 2:
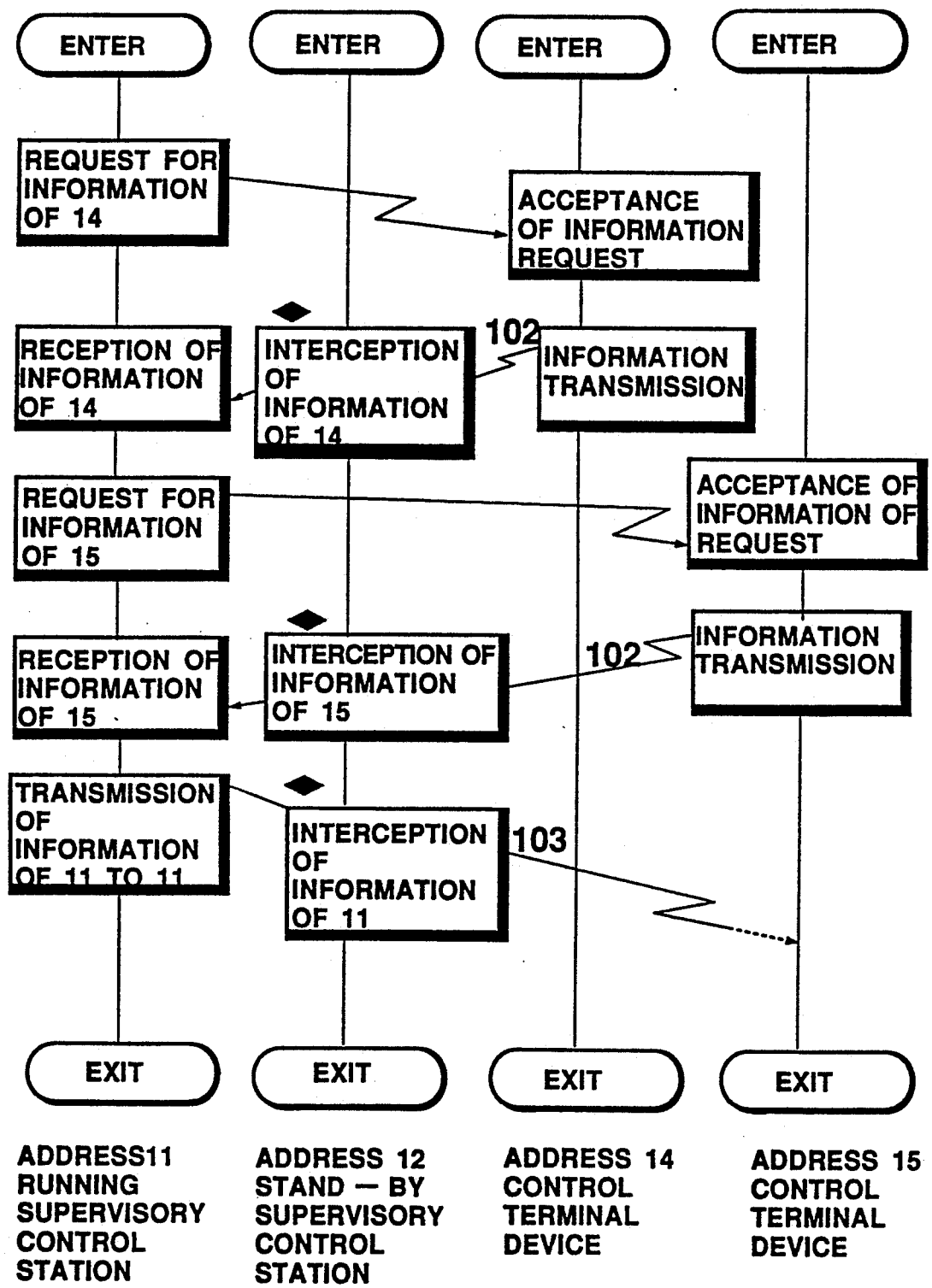
FIG. 2 is a flow chart to show a process in which a running supervisory control station collects information from a control terminal device and a stand-by supervisory control station intercepts the information.

Next, FIG. 2 is a flow chart to show how the stand-by supervisory control, station 12 intercepts information from the control terminal devices 14, 15 in a process in which the running supervisory control station 11 collects the information.

As shown in FIG. 1, the running supervisory control station 11 collects information from the control terminal devices 14, 15 successively in accordance with the information route 102.

Moreover, the running supervisory control station 11 sends its internal data on the transmission passage 101 to an imaginary station in accordance with the information route 103 at the end of each period of a sequence of data collection from the control terminal devices 14, 15. Herein, the term "imaginary station" means a non-existent address on the transmission passage 101, and preferably the supervisory control station 11 itself in this case. In the case of sending to the supervisory control station 11 itself, it does not receive the data, or ignores the data to be received.

The stand-by supervisory control station 12 intercepts information flowing on the transmission passage 101 in accordance with the information route 104.

Moreover, the stand-by supervisory control station 12 effects data collection from the respective control terminal devices 14, 15, and detects an abnormality of the running supervisory control station 11 based on the existence of data sent from the running supervisory control station 11 on the transmission passage 101 to the imaginary station. When the existence of the data is not detected, that is, when the abnormality is detected, control by the running supervisory control station 11 is switched to control by the stand-by supervisory control station 12, thereby carrying out back-up switching.

In FIG. 2, the manner in which information is transmitted among the respective stations is shown in a time sequence. Incidentally, each black-colored rhomb means a process of information interception.

Namely, the running supervisory control station 11 collects information from the respective control terminal devices 14, 15 on the transmission passage 101 in a manner in which it requests information from the control terminal devices 14, 15, receives the information, and transmits internal data therof to the imaginary station, that is, the control station 11 itself, and then the sequence of the process is completed.

When the control terminal devices 14, 15 receive the request from the running supervisory control station 11, they transmit information thereto, respectively.

The stand-by supervisory control station 12 always intercepts information on the transmission passage 101, and when it intercepts data sent from the supervisory control station 11 to the imaginary station, it indicates that the sequence of the process is completed.

At that time, since all information on the transmission passage 101 is collected and also the information of the running supervisory control station 11 is collected, it can be recognized that the sequence of the process of information collection is normally completed.

In the case, when the internal data from the running supervisory control station 11 to the imaginary station are not received at a predetermined time, some abnormality occurred in the running supervisory control station 11. Even though the information from the running supervisory control station 11 is received at the predetermined time, when the information includes flags showing an internal abnormality of the running supervisory control station 11, the stand-by supervisory control station 12 recognizes the abnormal condition.

In case that some abnormality of the running supervisory control station 11 is detected as stated above, since the stand-by supervisory control station 12 has already received all the information through the transmission passage 101 in parallel to the process where the running supervisory control station 11 collects the information from the control terminal devices 14, 15, it effects the function of the running supervisory control station 11 in place thereof directly.

Figure 3:
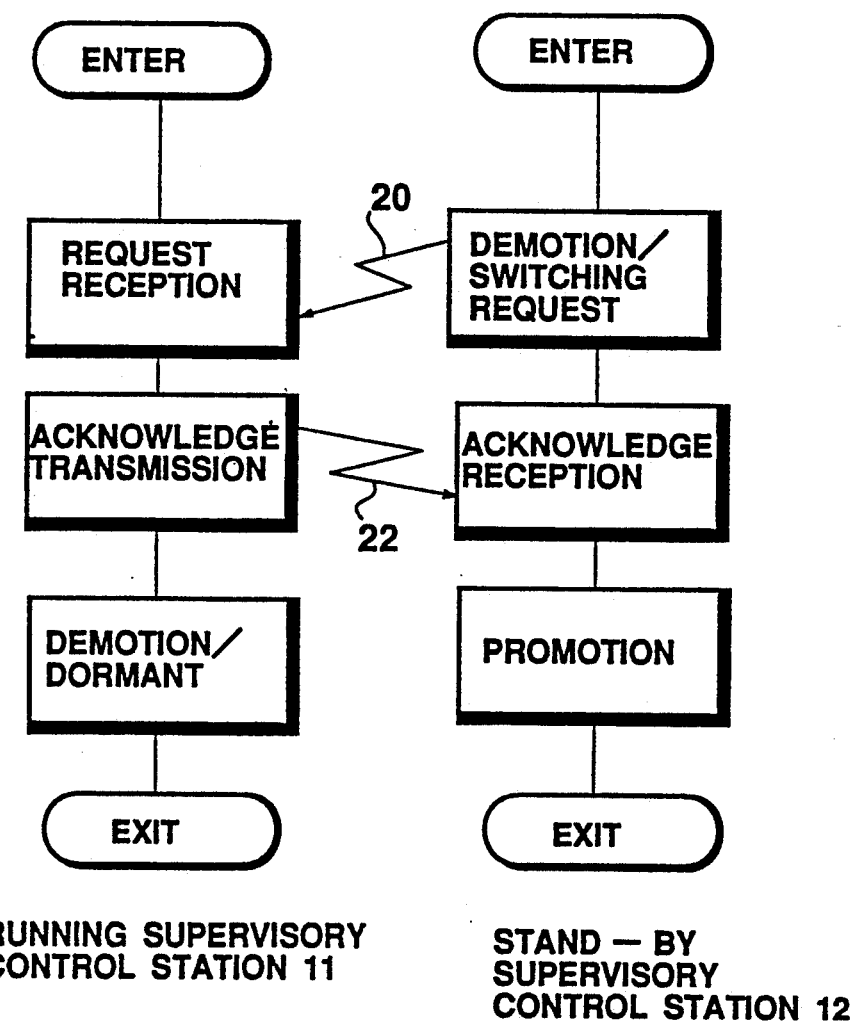
FIG. 3 is a flow chart to show an example of a process after the running supervisory control station transmits data for showing an abnormal condition to an imaginary station in the process shown in FIG. 2.

When the stand-by supervisory control station 12 becomes (or is promoted to) a running state in place of the running supervisory control station 11, the running supervisory control station 11 is separated from the transmission passage 101 or becomes (or is demoted to) another stand-by station. Namely, as shown in FIG. 3, the stand-by supervisory 12 having detected the abnormality transmits a promotion-request signal 20 to the running supervisory control station 11 through the transmission passage 101. In response to the promotion-request signal 20, the running supervisory control station 11 transmits a permission signal 22 to the stand-by supervisory control station 12 through the transmission passage 101, then when the stand-by station 12 receives the signal 22, the promotion of the stand-by station 12 and the demotion of the running station 11 are effected.

As stated above, according to the system of this embodiment, the stand-by supervisory control station 12 intercepts information on the transmission passage 101 while the running supervisory control station 11 collects the information from the control terminal devices 14, 15. Moreover, tracking of the information tracking between the running station with an abnormality and the stand-by station, which is required independently in conventional systems becomes unnecessary. Thus, the process for promotion and demotion can be performed rapidly.

Further, in the system of this embodiment, a contact setting output and of the input abnormality to an independently-provided watchdog timer becomes unnecessary, as well as cables between them, thereby simplifying the system.

In order to answer requests at high speed and high reliability to the transmission passage 101, the communication control device is composed as described below, includes doubling the transmission passage, enhancing reliability and responsibility of its components.

For example, the following hardware is incorporated in the communication control device.

Figure 4:
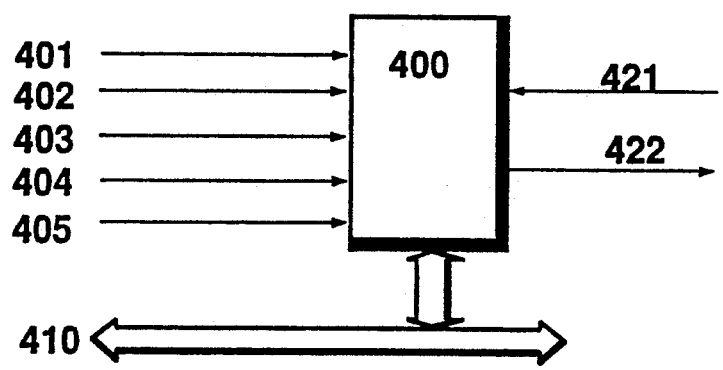
FIG. 4 is a block diagram to show the specific structure and function of a communication control device shown in FIG. 1.
Figure 5:
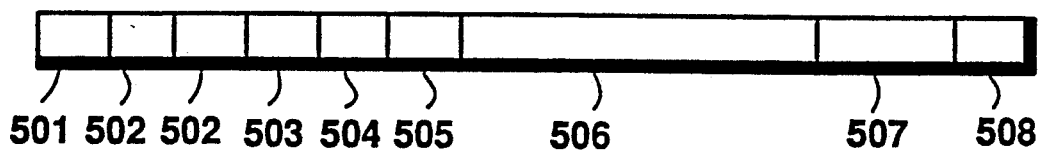
FIG. 5 is a diagram to show an example of a transmission format incorporating the data for showing an abnormal condition.

Namely, in the communication control device there is incorporated a large scale integrated circuit LSI 400 as shown in FIG. 4 so as to transmit the abnormal condition of the running station in accordance with a format as shown in FIG. 5.

Signal lines (input-output) required for the normal communication control device are designated by reference numerals 410, 421, 422. The LSI 400 is characterized in that it effects an input process of signals 401 to 405 which, for example, are interrupt request signals to be inputted in a interrupt controller and non-maskable interrupt signals.

Namely, by programs of the LSI 400, it becomes possible to catch edges of the signals 401 to 405 at which they are changed into active conditions so as to transmit a signal without a portion 506 as shown in FIG. 5 on the transmission passage 410 to an imaginary station or the station which transmits the signal.

When these signals are received on the reception side, the process of an MPU (Main Processing Unit) for controlling the communication control device may be interrupted by signals.

Moreover, the active conditions of the signals 401 to 405 may be so arranged as to be latched.

In summary, when the MPU is abnormal, these inputted signals are separated from an interface portion of the MPU so that they are not influenced by the operation of the MPU and functions of these signals are performed in a process (e.g., microprogram) which is independent of a program of the MPU.

Thus, the transmission passage is usable so far as the communication control device (e.g., LSI) is not abnormal even when the MPU is running.

Moreover, the circuit may judge and process the promotion and demotion on the transmission passage, and optionally may be operated under the permission of the MPU.

FIG. 5 shows an example of a format of the transmission data in case of HDLC. In the drawing, a portion designated by reference numeral 505 is an additional portion according to the present invention. The portion is automatically inserted by the above circuit 400.

As described in detail above, according to the control system of the present invention, the stand-by supervisory control station intercepts information on the transmission passage while the running supervisory control station collects the information from the control terminal devices. Moreover there becomes unnecessary to have information tracking (between the running station with an abnormality and the stand-by station) which is required independently in conventional systems. Thus, the process for the promotion and demotion can be performed rapidly.

Further, in the system of this embodiment, the contact setting output and input of the abnormality with the independently-provided watchdog timer becomes unnecessary, as does cables between them, thereby simplifying the system.

Various modifications will become possible for those skilled in the art after receiving the teachings of the present disclosure without departing from the scope thereof.

What is claimed is:

1. A master-slave-type control system, comprising:
   a common transmission passage for transmitting various data;
   at least one control terminal device connected to said transmission passage for sending first data repeatedly on said transmission passage;
   a normal supervisory control station, connected to said transmission passage, for collecting said first data sent to said transmission passage from each said control terminal device for sending predetermined second data to an imaginary station on said transmission passage; and
   a stand-by supervisory control station, connected with said control terminal device and said normal supervisory control station only through said transmission passage, for collecting said first data by intercepting said first data sent on said transmission passage from each said control terminal device and for detecting an abnormality of said normal supervisory control station in accordance with said second data obtained by intercepting said second data sent to said imaginary station on said transmission passage from said normal supervisory control station;
   wherein said first data concerns information to be communicated between said control terminal device and a currently operative one of said normal supervisory control station and said stand-by supervisory control station which is currently supervising operation of each said control terminal device, while said second data concerns information on an internal state of said normal supervisory control station; and
   wherein said stations carry out switching from control by said normal supervisory control station to control by said stand-by supervisory control station when said abnormality of said normal supervisory control station is detected by said stand-by supervisory control station.

2. The master-slave-type control system according to claim 1, wherein
   said stand-by supervisory control station detects said abnormality of said normal supervisory control station as nonexistence of said second data normally sent to said imaginary station on said transmission passage from said normal supervisory control station.

3. The master-slave-type control system according to claim 1, wherein when said stand-by supervisory control station detects said abnormality of said normal supervisory control station, said normal supervisory control station carries out switching from control by said normal supervisory control station to control by said stand-by supervisory control station.

4. The master-slave-type control system according to claim 1, wherein when said stand-by supervisory control station detects said abnormality of said normal supervisory control station, said stand-by supervisory control station sends a request signal for promotion to normal station status to said normal supervisory control station through said transmission passage, said normal supervisory control station sends a permission signal to said stand-by supervisory control station through said transmission passage, in response to said request signal for promotion, for promoting said stand-by supervisory control station to said normal station status, and, when said stand-by supervisory control station receives said permission signal, said stand-by supervisory control station takes over operation as a normal supervisory control station in accordance with said first data collected by intercepting said first data, and said normal supervisory control station demotes itself to a stand-by station status by sending said permission signal.

5. The system of claim 1, wherein said normal supervisory control station transmits said second data at an end of a period of collection of said first data from said control terminal device by said normal supervisory control station.

6. A method of controlling a master-slave-type control system including a common transmission passage for transmitting various data, at least one control terminal device connected to said transmission passage, a normal supervisory control station, connected to said transmission passage for supervising operations of said control terminal device, and a stand-by supervisory control station connected with said control terminal device and said normal supervisory control station only through said transmission passage for supervising operations of said control terminal device in case said normal supervisory control station is disabled, the method comprising the steps of:

transmitting first data concerning information to be communicated between said control terminal device and a currently operative one of said normal supervisory control station and said stand-by supervisory control station which is currently supervising operation of said control terminal device, through said common transmission passage between said normal supervisory control station and said control terminal device;

intercepting said first data transmitted on said common transmission passage at said stand-by supervisory control station;

transmitting second data, concerning information about an internal state of said normal supervisory control station, from said normal supervisory control station through said common transmission passage to an imaginary station having a non-existent address;

intercepting said second data transmitted on said common transmission passage at said stand-by supervisory control station;

detecting an abnormality of said normal supervisory control station by said stand-by supervisory control station in accordance with said second data obtained by intercepting said second data sent to said imaginary station; and switching from control by said normal supervisory control station to control by said stand-by supervisory control station when said abnormality of said normal supervisory control station is detected by said stand-by supervisory control station.

7. The method of claim 6, wherein said stand-by supervisory control station detects said abnormality of said normal supervisory control station in case of an absence of transmission of said second data from said normal supervisory control station to said imaginary station.

8. The method of claim 6, wherein said switching step from said normal supervisory control station to said stand-by supervisory control station is carried out by the steps of:

sending a request signal from said stand-by supervisory control station to said normal supervisory control station when said abnormality of said normal supervisory control station is detected by said stand-by supervisory control station, through said common transmission passage;

sending a permission signal from said normal supervisory control station to said stand-by supervisory control station when said request signal is received by said normal supervisory control station from said stand-by supervisory control station through said common transmission passage; and switching control for supervising operation of said control terminal device from said normal supervisory control station to said stand-by supervisory control station when said permission signal is received by said stand-by supervisory control station from said normal supervisory control station through said common transmission passage.

9. The method of claim 6, wherein said second data are transmitted by said normal supervisory control station at an end of a period of collection of said first data from said control terminal device by said normal supervisory control station.

* * * * *